United States Patent
Ahn et al.

(10) Patent No.: US 7,315,748 B2
(45) Date of Patent: Jan. 1, 2008

(54) METHOD OF INFORMING UPLINK SYNCHRONIZATION USING DOWNLINK TPC BIT PATTERNS

(75) Inventors: Joon-Kui Ahn, Seoul (KR); Seung-Hwan Won, Gyeonggi-Do (KR)

(73) Assignee: LG Electronics Inc., Soeul (KR)

( * ) Notice: Subject to any disclaimer, the term of this patent is extended or adjusted under 35 U.S.C. 154(b) by 621 days.

(21) Appl. No.: 10/845,087

(22) Filed: May 14, 2004

(65) Prior Publication Data

US 2005/0054365 A1 Mar. 10, 2005

(30) Foreign Application Priority Data

May 16, 2003 (KR) ..................... 10-2003-0031276

(51) Int. Cl.
*H04B 7/00* (2006.01)
*H04B 15/00* (2006.01)

(52) U.S. Cl. .................. 455/502; 455/69; 455/436; 455/115.1; 455/226.1; 455/226.2; 370/331; 370/332; 370/333; 370/318

(58) Field of Classification Search ............... 455/502, 455/523, 69, 436, 437, 115.1, 115.3, 226.1–226.2; 370/331–333, 335, 318, 502
See application file for complete search history.

(56) References Cited

U.S. PATENT DOCUMENTS

| | | | |
|---|---|---|---|
| 6,285,887 B1 * | 9/2001 | Mimura ..................... | 455/522 |
| 6,356,595 B1 * | 3/2002 | Czaja et al. ................ | 375/262 |
| 2005/0202837 A1 * | 9/2005 | Tanabe ....................... | 455/502 |

FOREIGN PATENT DOCUMENTS

EP 0 999 657 B1 5/2000

OTHER PUBLICATIONS

"Optimum TPC command sequence in WCDMA", Chen et al, Proceeding ICII 2001—Beijing 2001 International conference, vol. 2, pp. 134-138.*
Chen, Chaoyang et al.; "Optimum TPC Command Sequence in WCDMA"; Proceedings of 2001 International Conference on Info-Tech and Info-Net; ICII 2001—Bejing, China, vol. 2; Oct. 29-Nov. 1, 2001; pp. 134-138.
Suda, H. et al.; "A Fast Transmit Power Control Based on Markov Transition for DS-CDMA Mobile Radio"; 1998 International Conference on Universal Personal Communication; vol. 1, Oct. 5-9, 1998, pp. 235-239.
3GPP TS 25.214 V3.12.0 (Mar. 2003); "Technical Specification Group Radio Access Network"; Physical Layer Procedures (FDD); (Release 1999).
International Search Report dated Aug. 23, 2004.

* cited by examiner

*Primary Examiner*—Matthew D. Anderson
*Assistant Examiner*—Sujatha Sharma
(74) *Attorney, Agent, or Firm*—KED & Associates, LLP

(57) ABSTRACT

A method of informing a terminal of uplink synchronization acquisition in a mobile communication system by using downlink transmit power control (TPC) bits. The base station modifies and transmits power control bit patterns according to certain 'N' values defined as a pattern 01 count, and the terminal detects an indicator that informs uplink synchronization acquisition by the modified power control bit pattern. The terminal also maintains the transmit power of the synchronization acquisition timing by increasing the transmit power by an amount equal to the decrease caused by receiving the power control bits for detecting uplink synchronization acquisition.

32 Claims, 7 Drawing Sheets

| N | dB/frame |
|---|---|
| 0 | 15 |
| 1 | 5 |
| 2 | 3 |
| 3 | about 2 |
| ~ | ~ |
| 7 | 1 |
| ~ | ~ |
| 30 | about 0.5 |

Nth frame

FIG. 5

| '0101' count pattern | Ratio of 0 to 1 | Length of '0' (RSE) | Length of '0' (Error free) |
|---|---|---|---|
| N=0: 111111111111111 | NA | 000 | 0 |
| N=1: 011011011011011 | 1:2 | 00000 | 00 |
| N=2: 010110101101011 | 2:3 | 00000 | 00 |
| N=3: 01010110101011 | 3:4 | 000000 | 00 |
| N=4: 0101010110101011 | 4:5 | 000000 | 00 |
| N=5: 01010101011010101011 | 5:6 | 000000 | 00 |
| N=6: 010101010101 10101010101011 | 6:7 | 000000 | 00 |
| N=7: 01010101010101 1010101010101011 | 7:8 | 000000 | 00 |
| ~ N=30 | ~ 30:31 | ~ 000000 | ~ 00 |

METHOD OF INFORMING UPLINK SYNCHRONIZATION USING DOWNLINK TPC BIT PATTERNS

BACKGROUND OF THE INVENTION

1. Field of the Invention

The present invention relates to mobile communications, and more particularly to a method of informing uplink synchronization acquisition in a mobile communication system by using downlink transmit power control (TPC) bits so that a terminal can be informed that uplink synchronization has been obtained.

2. Background of the Related Art

In general, RRC (Radio Resource Control) states are defined to distinguish the operational modes and communication states of a terminal (e.g., mobile station, subscriber unit, user equipment (UE), etc.). The RRC states can be broadly defined into an idle mode and a connected mode. When an RRC connection is established between the terminal and the UTRAN (Universal Terrestial Radio Access Network), for example, the terminal transitions from the idle mode to the connected mode. As shown in FIG. 1, the connected mode can be classified into four states based upon the types of physical channels that the terminal can use: CELL_DCH (cell dedicated channel), CELL_FACH (cell forward access channel), CELL_PCH (cell paging channel), and URA_PCH (URA paging channel) states. Here, each RRC state can transition to another RRC state or to a different mode. The four types of states under the connected mode will now be considered in more detail.

First, the CELL_DCH is a state in which a dedicated channel (DCH), necessary for continuous data transmissions, is allocated. Here, a downlink shared channel (DSCH) can also be used. The CELL_FACH is a state for monitoring the forward access channel (FACH), in which a terminal monitors all FACHs being transmitted thereto. Also, the CELL_PCH and URA_PCH are states for monitoring a paging channel (PCH). The CELL_PCH and the URA_PCH are distinguished from each other based on whether a cell is to be updated or whether a URA (UTRAN Registration Area) is to be updated.

Accordingly, rapid data transmission requires a rapid transition from the CELL_FACH to CELL_DCH, and during this transition, transport channels and physical channels are reconfigured. However, for transition from the CELL_FACH to CELL_DCH, namely, for establishing one dedicated channel (DCH), synchronization of the uplink and downlink channels between the terminal and the base station needs to occur.

In general, in a WCDMA radio communication system, the terminal (e.g., mobile station, user equipment (UE), etc.) searches the downlink signal transmitted from the base station (e.g., Node B) to obtain downlink synchronization and to establish an initial call with the network. Once the synchronization of the downlink is acquired, the terminal transmits a power control preamble for a certain amount of time to achieve network timing, namely, to allow the base station to acquire uplink synchronization, while the base station searches for uplink synchronization.

As previously explained, the terminal searches the downlink signal transmitted from the base station to obtain a downlink synchronization, and then transmits a preamble for power control for a certain amount of time such that the base station may obtain uplink synchronization. Thus, because the terminal can only transmit data frames after a preamble transmission for performing power control has been completed, the terminal must wait a certain amount of time to transmit/receive data, even if the base station has already obtained uplink synchronization before the preamble transmission has been completed.

SUMMARY OF THE INVENTION

Accordingly, an object of the invention is to solve at least the above problems and/or disadvantages and to provide at least the advantages described hereinafter.

Another object of the present invention is to detect uplink synchronization in a short amount of time using an uplink synchronization acquisition identifier.

Yet another object is to provide an uplink synchronization acquisition identifier that is properly detected.

To achieve these and other objects, the present invention provides a novel downlink bit pattern to indicate uplink synchronization including a bit sequence having power control bits instructing a terminal to increase its transmit power and at least one indictor bit to indicate when uplink synchronization is acquired. Further, the at least one indicator bit has a different number of bits based on whether received indicator bit reception errors are considered or disregarded.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein:

FIG. 5 is a diagram classifying the uplink synchronization acquisition indicators according to the present invention;

BEST MODE OF THE INVENTION

The present invention can be implemented in a CDMA mobile communication system. However, the present invention can also be implemented in other types of communication systems operating under other standards.

Figure 1:
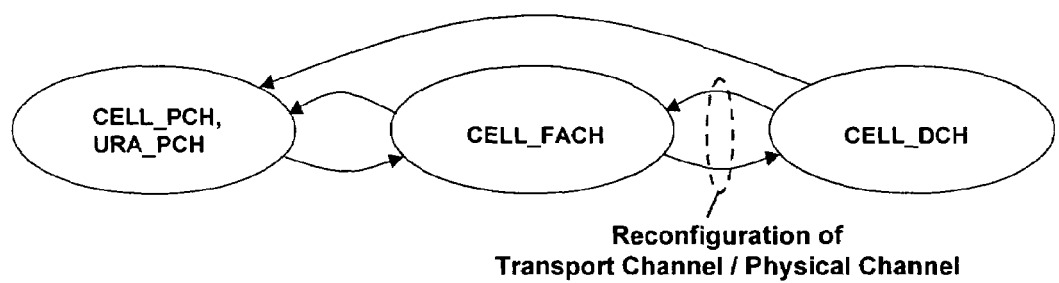
FIG. 1 is a diagram showing a connection transition diagram for an initial call connection.
Figure 2:
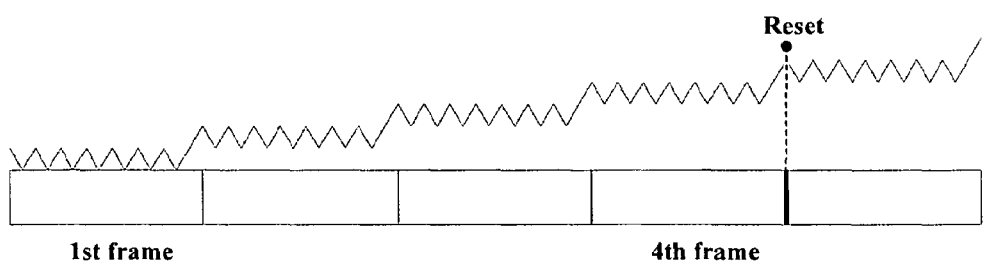
FIG. 2 is a diagram showing an operation procedure of a downlink TPC 0101 count when the parameter value (N) is 7.

When searching for uplink synchronization, the base station determines and transmits a TPC (transmit power control) bit pattern over the downlink according to a parameter value (N) defined as a 'pattern 01 count' to control the uplink transmission power of the terminal. The TPC pattern has a "0" and "1" pattern being repeated during an "N" value (i.e., for an 'N' number of times, N>0). As shown in FIG. 2, the TPC pattern is forcibly reset when CFN mod 4=0 at a starting point of each frame such that the initial pattern (0101 etc.) is continuously repeated.

Figures 3, 4:
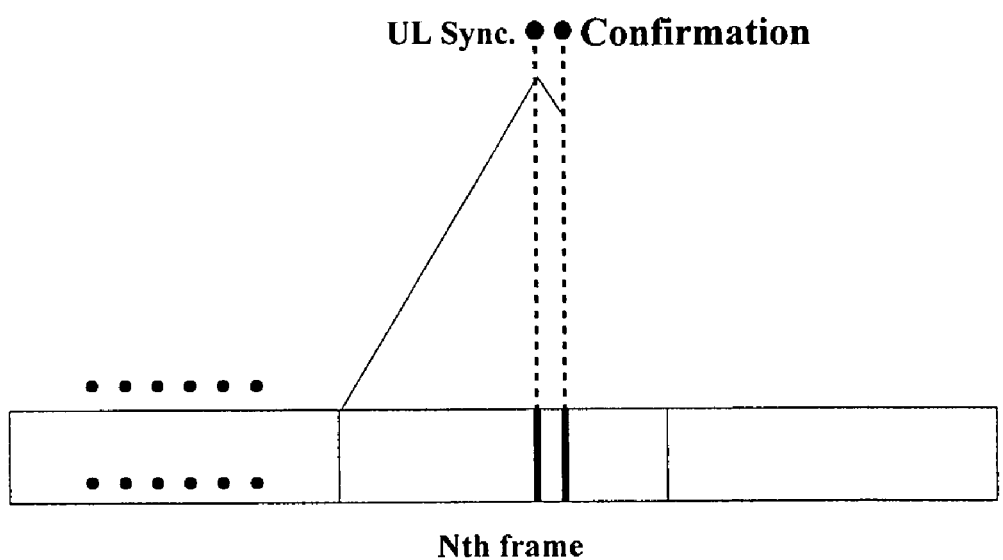
FIG. 3 is a diagram showing the transmit power increase rate of the terminal per one frame according to the parameter value (N)
FIG. 4 is a diagram for explaining one uplink synchronization acquisition method.

In addition, if a TPC bit of '1' indicates a transmission power increase and '0' indicates a transmission power decrease, the base station repetitively transmits '1' as the TPC bit when N=0, and in other situations (i.e., N≠0) a pattern having '1' added once after an 'N' number of '01' continuous patterns is repetitively transmitted. For example, when N=7, the bit pair '01' is repetitively transmitted by the base station seven times and then a '1' is transmitted thereafter. In this instance, the transmit power of the terminal is increased by 1 dB per frame since a frame includes 15 slots for power control. The increasing rate of the terminal's transmit power according to the parameter value (N) is shown in FIG. 3. Note that a larger value of "N" results in a smaller increase in the gain per frame.

If the parameter value (N) is 0, the downlink TPC has a '111 . . . 111' pattern and thus the terminal's transmit power continues to increase. When the terminal's transmit power continuously increases, the base station can obtain synchronization of the uplink within a short amount of time. However, if the terminal's transmit power is drastically increased during an initialization state, reception errors may occur at the base station modem and may have adverse influences on the call establishment attempt link and on the entire cell.

Accordingly, the base station typically uses N>0, whereby 'N' is within a range of up to 30, for example. Here, optimal 'N' values can be set according to a manufacturer's standards. The larger the 'N' value, the more stable the initialization establishment can be. However, an 'N' value that is too large causes undesirable delays in call set up, and thus an appropriate 'N' value must be found.

One method of minimizing the time for acquiring uplink synchronization is for the base station to obtain the synchronization and inform synchronization has been established to the terminal, instead of using a fixed power control preamble instructed from a higher layer.

Namely, instead of the terminal only performing power control (i.e., preamble transmission) during a remaining time after acquiring uplink synchronization (which results in data transmission delays), a distinct identifier indicating whether synchronization has been obtained is used and immediately detected so that transmission of the data can begin. That is, this method uses a single bit identifier to inform the terminal that the base station has obtained the uplink synchronization thereby reducing the time required in uplink synchronization.

FIG. 4 illustrates one such method for acquiring uplink synchronization. As shown in FIG. 4, after initializing the transmit power of the terminal to an appropriate transmission power, the base station continues to send power up commands to the terminal until uplink synchronization is obtained. If the uplink synchronization is obtained at the $N^{th}$ frame, the base station uses a synchronization identifier to transmit a one-time power down command to the terminal. Here, the synchronization identifier is an identifier sent via the downlink TPC by the base station to the terminal to inform the terminal that uplink has been established.

Thus, after confirming receipt of the synchronization identifier sent from the base station, the terminal changes to the DCH state and begins data transmission.

However, in the above method, using the single downlink TPC bit as the synchronization acquisition identifier to reduce the time for acquiring uplink synchronization can only be done if the TPC bits transmitted on the downlink during the synchronization establishment procedure is a pattern with '1's being repeated, namely, only when N=0.

In more detail, if the TPC bits transmitted on the downlink during the synchronization establishment procedure is a pattern with '0101' (namely, because N>0 is typically used to prevent an abrupt increase of transmit power), it is difficult to apply the method shown in FIG. 4. In other words, because the synchronization identifier includes only a single bit that is added to the end of the TPC bit pattern (namely, a '0' added at the end of a sequence of repeating '1's), it is difficult to detect the single-bit identifier when the TPC pattern includes both '0's and '1's (i.e., for N>0) for instructing the terminal to gradually increase its transmit power.

Also, because the terminal determines that uplink synchronization has been established even if only one '0' TPC bit is received and would begin to transmit a data frame, an erroneous operation may occur at the terminal when there is a reception error for the downlink TPC bit. Namely, examples of such errors would be if the base station transmits a TPC bit of '1' but the terminal interprets this as a '0,' or if the base station transmits a TPC bit of '0' but the terminal interprets this as a '1.' In other words, this single bit identifier is erroneously identified.

In particular, when the condition N=0 is used, and if the base station does not acquire uplink synchronization (i.e., a "missing event" situation), the terminal continues to increase its transmit power even though the terminal's transmit power is at a sufficiently large value, which drastically increases uplink interference, just as in a "false alarm" situation. Thus, the time incurred in acquiring synchronization is undesirably increased, which causes the cancellation of call connections, thereby increasing the instability of the entire cell. Also, the vulnerability of the system stability during an initial call establishment between the terminal and the base station is increased, while the uplink capacity is decreased due to the increase of uplink interference. In particular, a single bit downlink TPC '0' has problems of not being able to detect a RSE (random single error). Thus, the chances that a single bit downlink TPC may be misread (misinterpreted due to errors) is undesirably high.

In another method, the time of call establishment is minimized between the terminal and base station by reducing the uplink synchronization acquisition time in a WCDMA mobile communication system. In this method, a particular pattern is provided that can be used in the downlink TPC for establishing a dedicated channel (DCH) more quickly, and that applies an appropriate detection method for the created TPC pattern to improve the probability of acquiring uplink synchronization. In particular, this method includes acquiring uplink that allows a more rapid change from CELL_FACH to CELL_DCH, to thereby minimize throughput reduction due delays during synchronization acquisition. The pattern is generated so the DPDCH Dedicated Physical Data Channel) can be immediately transmitted when the terminal recognizes that the base station acquired uplink synchronization.

The uplink "synchronization acquisition indicator" is provided according to a certain 'N' value. Preferably, the synchronization acquisition indicator is determined by considering situations where 1) errors are not expected in the TPC bit sequence transmitted over the downlink and 2) where at least a single error (i.e., a random single error (RSE) is expected. Thus, a synchronization acquisition indicator is determined based on a particular 'N' value and whether or not a downlink TPC bit reception error is considered or disregarded.

In this method, when uplink synchronization is acquired by the base station, one or more indicator bits are included with the bit sequence. The number of indicator bits depends on whether indicator bit reception errors at the terminal are considered or disregarded. Note, the synchronization acquisition indicator may be added at the end of a frame or inserted during a frame.

FIG. 5 illustrates two types of synchronization acquisition indicators (namely, 0 and 00) when errors are disregarded, and three types of synchronization acquisition indicators (namely, 000, 00000, and 000000) when a single RSE is considered.

The base station initially determines the 'N' value and transmits the value to the terminal, and an uplink synchronization acquisition indicator for the corresponding 'N' value is transmitted to the terminal. As noted above, the particular 'N' value can be preset by the communications equipment manufacturer, or determined by hardware or software within the communication system according to a particular communication environment.

When a certain 'N' value is determined and potential TPC bit reception errors are disregarded, the type of synchronous acquisition indicator to be used is determined according to the '0101' count pattern shown in FIG. 5, for example. As shown, the right most column in FIG. 5 includes synchronization acquisition indicators to be used when errors are disregarded, and the column to the left of that column includes synchronization acquisition indictors to be used when errors are regarded.

Namely, if N=0 and no errors are considered, the base station repeatedly transmits a continuous sequence of '1's (i.e., 111 . . . ). Then, when uplink synchronization is acquired, a single '0' is transmitted. Further, for N=1 through 30, the base station uses two '0's (i.e., 00) as the synchronous acquisition indicator because there are not two sequential zeros (i.e., 00) in the transmitted sequence.

Also, in addition to the above-described pattern, the present invention defines a downlink TPC pattern to be used as a synchronous acquisition indicator when errors generated at the terminal in downlink TPC reception are considered (such as the indicators shown in the second right most column). Namely, the present invention defines a downlink TPC pattern allowing a terminal to properly determine that uplink synchronization acquisition has been established, even when a TPC reception error is generated in a single bit at the terminal (or when bit errors occur in a sufficiently sparse manner).

Referring to FIG. 5, if N=0, the base station transmits three '0's (i.e., 000) as the synchronization acquisition indicator, because a single error (i.e., RSE) can be generated in three different types of situations. The reason why 3 bits are used rather than 2 bits is as follows. For example, assume the Node B transmits two sequential zeros ("00") to inform the UE that uplink synchronization has been established. As noted above, for N=0, the Node B transmits a TPC command of 15 bits that are all one ("111 . . . 111"). Thus, in this example, the following two TPC patterns are possible:

1) TPC=111111111111111 to request that the UE increase its transmit power, and
2) TPC=111110011111111 to inform the UE that uplink synchronization has been established (note, the two zeros (00) can be added at the end or inserted within the TPC command).

Then, assume there is a 1 bit error in the first command and there is also a 1 bit error in the second command. If the 1 bit error occurs in the "00" pattern of the second command, and a 1 bit error occurs in the first command at the same position, the following two TPC commands (which include a 1 bit error) could be transmitted:

1) TPC=111110111111111 to request that the UE increase its power (and with a 1 bit error), and
2) TPC=111110111111111 to inform the UE that uplink synchronization has been established (and with a 1 bit error).

In this example, the UE would not be able to distinguish between the first and second commands, because the commands match. Thus, the UE would either determine that uplink synchronization has been established or erroneously determine to increase its transmit power. This is why 3 bits (e.g., "000") are advantageously used as a synchronization acquisition indicator according to the present invention. FIGS. 6-12 graphically describe the above reasoning for different values of N and will be described in more detail.

Also, if N=1 or 2, the base station transmits five '0's (i.e., 00000) in place of five sequential TPC bits or added to the TPC bits as the synchronization acquisition indicator, because there are five types of situations in which a single RSE is generated. The reason why there are five types of situations in which a single RSE can be generated is similar to that discussed above for N=0, and will be discussed later with respect to FIGS. 7 and 8. In a similar manner, when N=3 through 30, the base station transmits six '0's (i.e., 000000) in place of six sequential TPC bits or added to the TPC bits as the synchronization acquisition indicator, because there are six types of situations in which a single RSE is generated.

Accordingly, when the base station transmits the synchronization acquisition indicator to the terminal using TPC patterns that ignore or consider reception errors, the terminal then detects the received synchronization acquisition indicator and correctly determines whether uplink synchronization has been acquired at the base station.

Next, FIGS. 6 through 12 show examples of synchronization acquisition indicators for the terminal when ignoring or considering reception errors for certain 'N' values.

1) Using TPC pattern (000) as the synchronous acquisition indicator when N=0 and RSE is considered.

Figure 6:
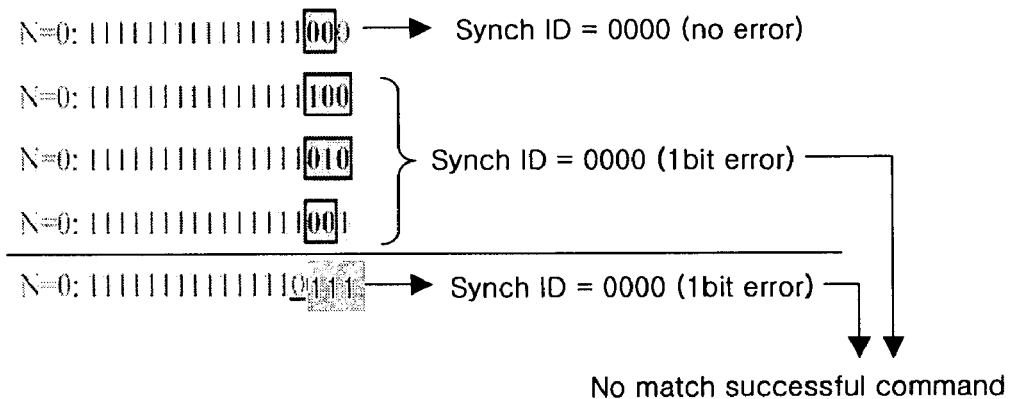
FIG. 6 is a diagram showing the determination of the uplink synchronization acquisition recognition pattern when N=0.

As shown in FIG. 6, when three zeros ("000") are used as the synchronization acquisition ID, the terminal determines that the synchronous acquisition indicator has been detected if two sequential '0's are detected from the TPC bit pattern.

If two sequential '0's are not detected, the terminal determines that the synchronous acquisition indicator has been detected if two '0's are detected within three sequential bits of the TPC bit pattern. Thus, as shown in FIG. 6, there is no match between a TPC command instructing the UE to increase its power and a TPC command informing the UE that uplink synchronization has been established. Therefore, the UE is able to correctly determine when uplink synchronization has been established, and begin transmission of data.

Figure 7:
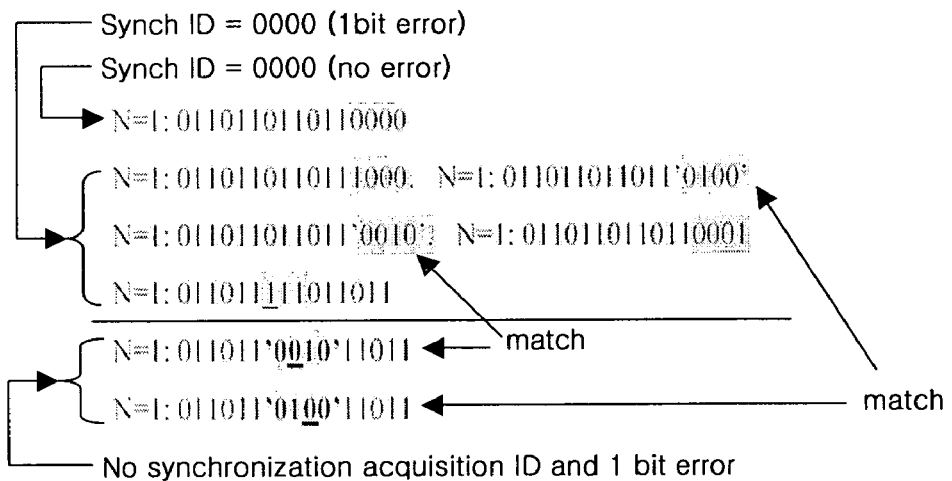
FIG. 7 is a diagram showing when the uplink synchronization acquisition indicator is not recognized at the terminal when N=1.

FIG. 7 shows an example in which the synchronization acquisition indicator is not detected at the terminal when the base station transmits '0000' as the synchronization acquisition indicator. Namely, when N=1, because there is a high probability that a synchronization acquisition indicator such as '0010' and '0100' may exist in a typical '0101' pattern (and thus a synchronization acquisition indicator would not be distinguishable), the terminal may not properly detect such synchronization acquisition indicator when '0000' is transmitted as the synchronization acquisition indicator due to the probability that one of the bits in '0000' may be misread. That is, as shown in FIG. 7, when a synchronization acquisition ID of four zeros ("0000") is used, there is a possibility that a TPC command instructing the UE to increase its transmission power and a TPC command informing the UE that uplink synchronization has been established match. Therefore, the UE will not properly determine when uplink synchronization has been established, and may continue to increase its power (causing interference) or may incorrectly assume uplink transmission has been established and start transmitted data (even though uplink synchronization may not have been established). Thus, as described previously, when N=1, the base station transmits five zeros '00000' instead of transmitting four zeros '0000' as the synchronization acquisition indicator.

2) Using TPC pattern (00000) as the synchronous acquisition indicator when N=1 and RSE is considered.

Figure 8:
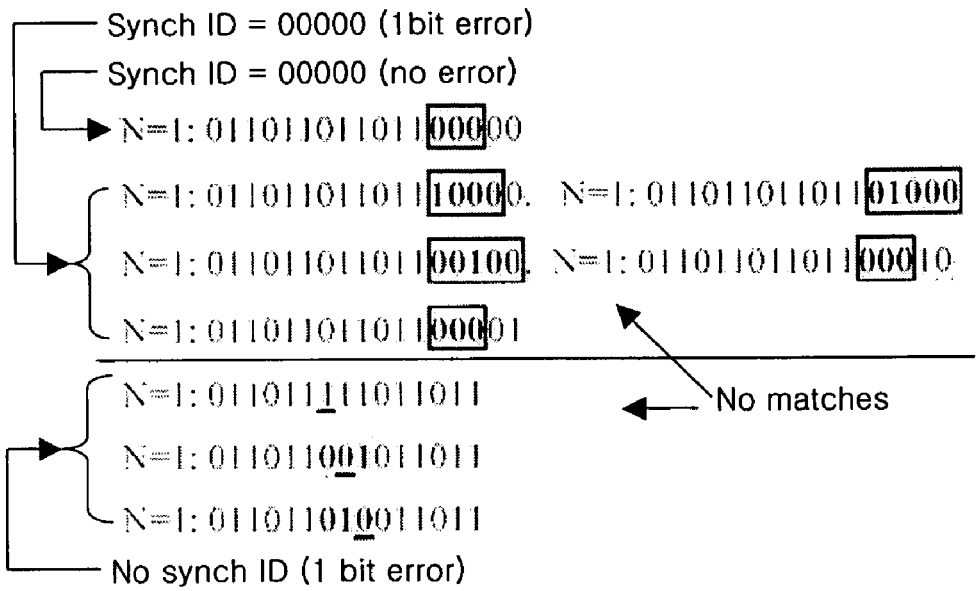
FIG. 8 is a diagram showing the determination of the uplink synchronization acquisition recognition pattern when N=1.

As shown in FIG. 8, when N=1, the terminal determines that a synchronization acquisition indicator is detected if three sequential '0's are found in the TPC bit pattern. However, if three sequential '0's are not detected, the terminal determines that the synchronous acquisition indicator has been detected if two '0's are detected within three sequential bits of the TPC bit pattern. Further, as shown, there is not a match between the different types of TPC commands.

3) Using TPC pattern (00000) as the synchronous acquisition indicator when N=2 and RSE is considered.

Figure 9:
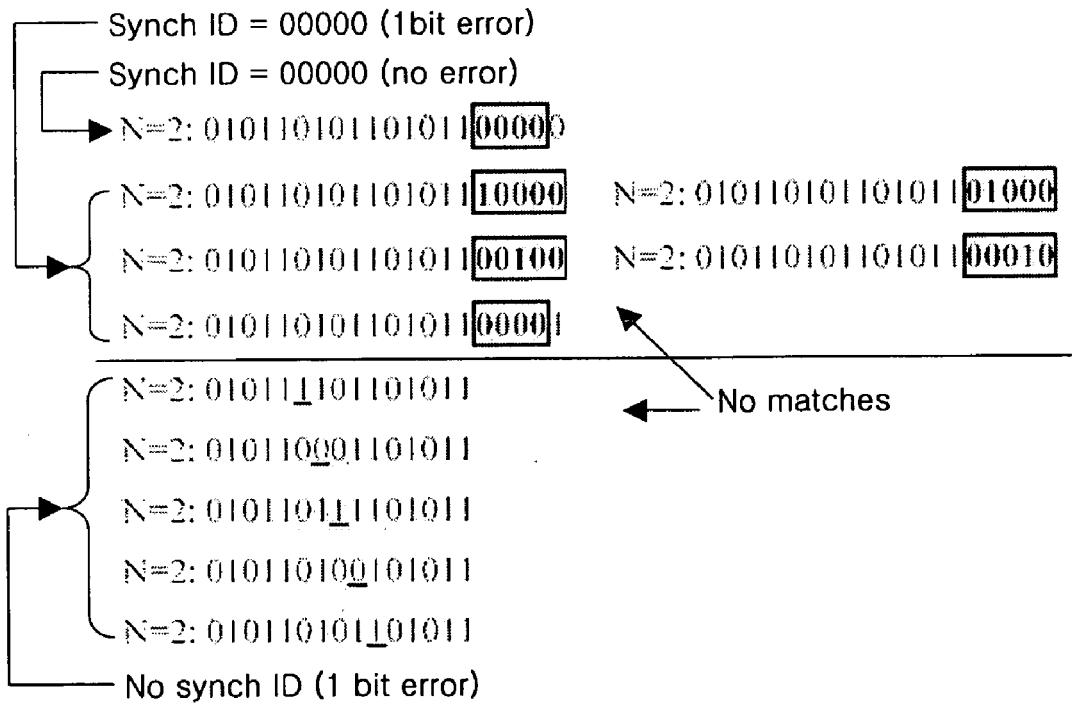
FIG. 9 is a diagram showing the determination of the uplink synchronization acquisition recognition pattern when N=2.

As shown in FIG. 9, the terminal determines that the synchronous acquisition indicator has been detected if four or more sequential '0's are detected from the TPC bit pattern. If four or more sequential '0's are not detected, the terminal checks five sequential bits and determines that the synchronous acquisition indicator has been detected if four '0's exist therein.

Figure 10:
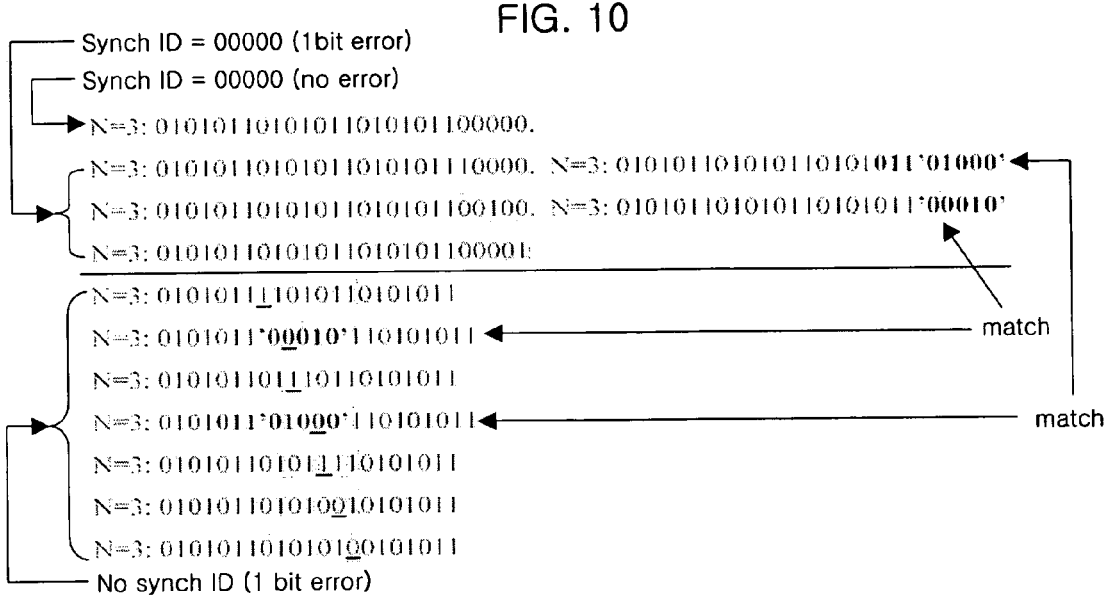
FIG. 10 is a diagram showing when the uplink synchronization acquisition indicator is not recognized at the terminal when N=3.

FIG. 10 shows an example for N=3 and in which the synchronization acquisition indicator is not detected at the terminal when the base station transmits '00000' as the synchronization acquisition indicator. Namely, when N=3, because there is a high probability that a synchronization acquisition indicator such as '00010' and '01000' may exist in a typical '0101' pattern (and thus a synchronization acquisition indicator would not be distinguishable), the terminal will probably not properly detect such a synchronization acquisition indicator. Thus, as described previously, when N=3, the base station transmits '000000' instead of transmitting '00000' as the synchronization acquisition indicator. That is, as shown in FIG. 10, it is possible that a TPC command including a synchronization ID matches a TPC command not including a synchronization ID.

4) Using TPC pattern (000000) as the synchronous acquisition indicator when N=3 and RSE is considered.

Figure 11:
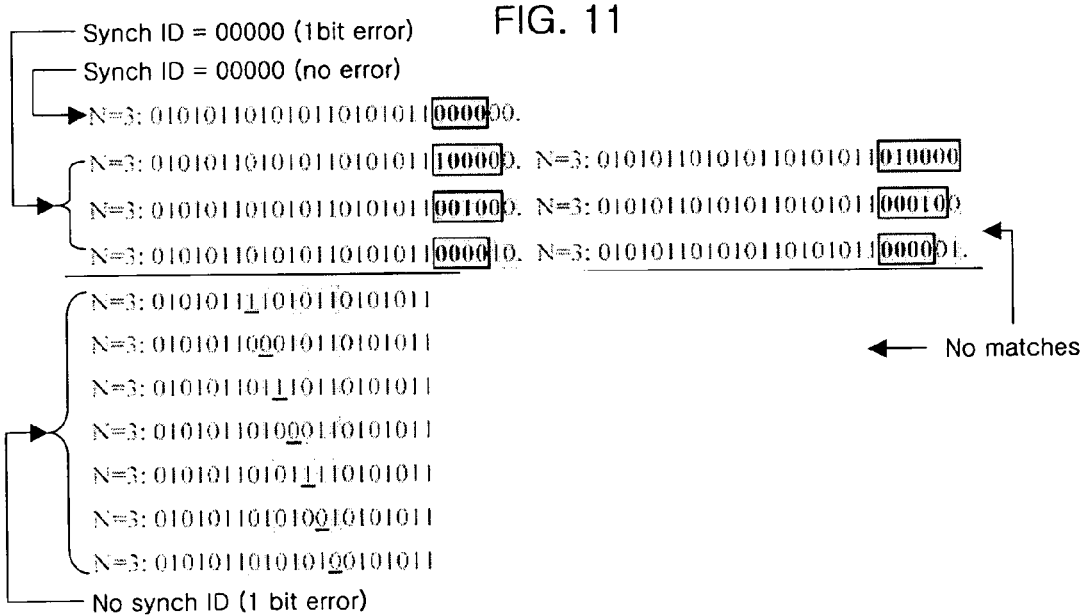
FIG. 11 is a diagram showing the determination of the uplink synchronization acquisition recognition pattern when N=3.

As shown in FIG. 11, the terminal determines that the synchronous acquisition indicator has been detected if four or more sequential '0's are detected from the TPC bit pattern. If four or more sequential '0's are not detected, the terminal detects the synchronous acquisition indicator using the following three procedures, for example.

First, if there is a '1' after '00' or '000,' the terminal checks five sequential bits and determines that the synchronous acquisition indicator has been detected if four '0's exist therein. Second, if there is a '1' after a '0,' then a sequence of '0000' (namely, '010000'), then the terminal indicates that the synchronous acquisition indicator has been detected. Third, if the case for '0100000' is ignored to simplify the detection process, the terminal determines that the synchronous acquisition indicator has been detected if four or more '0's exist within five sequential bits.

5) Using the TPC pattern (000000) as the synchronous acquisition indicator when N≧4 and RSE is considered.

Figure 12:
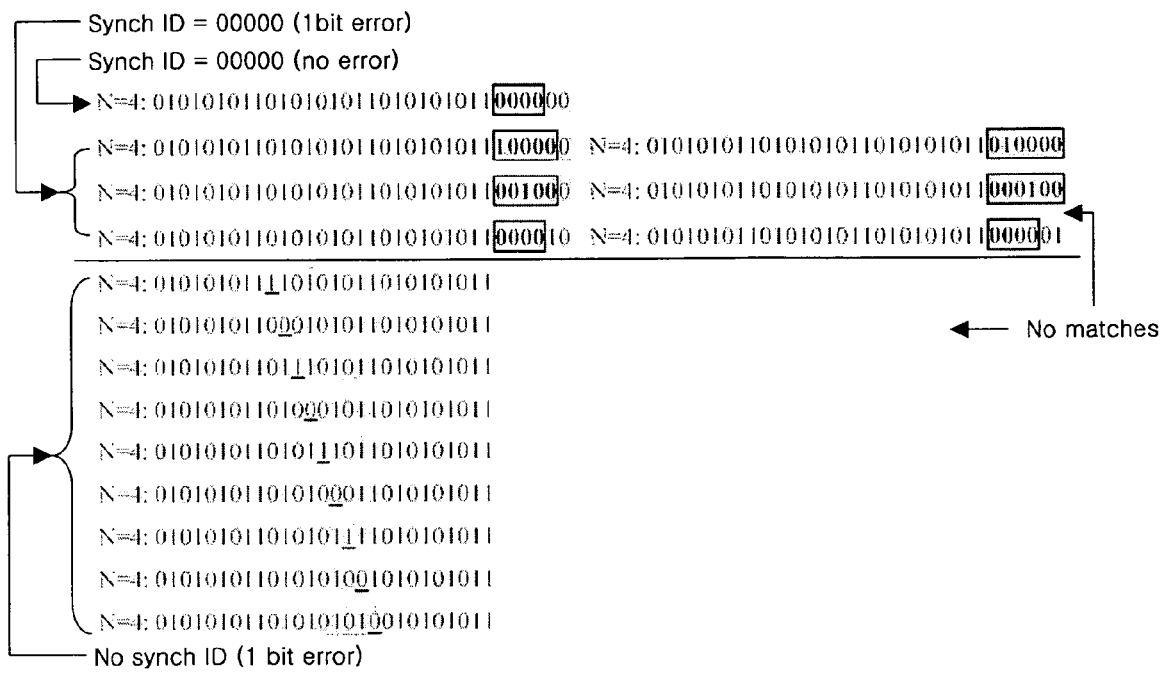
FIG. 12 is a diagram showing the determination of the uplink synchronization acquisition recognition pattern when N=4.

When N≧4 and the base station uses a TPC pattern with six '0's as the synchronization acquisition indicator, the pattern of the synchronization acquisition indicator is the same. Thus, as shown in FIG. 12, the terminal determines that a synchronization acquisition indicator has been detected if four or more sequential '0's are found. If four or more sequential '0's are not found, the synchronization acquisition indicator is detected by using the following three methods.

First, if a '1' is received after a '0' (or '000'), the terminal determines that a synchronization acquisition indicator has been detected if five or more '0's are found within six sequential bits that include the '0' (or '000').

Second, if a '1' is received after '00,' the terminal determines that a synchronization acquisition indicator has been detected if four or more '0's are found within five sequential bits.

Third, to simplify the above detection procedures, the situations for '010000' and '000100' can be ignored and the terminal determines that a synchronization acquisition indicator has been detected if four or more '0's are found within five sequential bits.

As described above, the present invention can properly inform a terminal as to when uplink (UL) synchronization is acquired by the base station. Reception errors at the terminal can be ignored or assumed. Assuming that bit reception errors will occur, the Node B properly informs the terminal that UL synchronization acquisition has been achieved even when there is an error in receiving one of the indicator bits. Although the exemplary embodiments describe instances of possible reception errors for a single bit, it can be understood that two or more reception errors can also be anticipated and handled by adapting the disclosed methods and modifying bit patterns accordingly.

Further, if the synchronization acquisition indicator sent from the base station has been detected by using the above-described methods, the terminal may increase its power by an amount equal to the decrease caused by the '0' during reception of the synchronization acquisition indicator. The reason for doing this is because the acquired synchronization may be lost if the transmit power is in a state that is lower than an appropriate level, so the terminal increases its transmit power to maintain the transmit power level of the synchronization acquisition timing.

For example, if N=0, the terminal may increase its transmit power by one step (i.e., a transmission unit for a transmit power) or two steps depending upon whether errors are ignored or assumed, and depending upon the type of error that may be generated. In other words, if two sequential '0's are detected, the terminal increases its transmit power by two steps because of the transmit power decrease caused by the detection of the two '0's, while the terminal increases its transmit power by one step if two sequential '0's are not detected.

In addition, if N=1, the terminal may increase its transmit power by 2 or 3 steps depending upon whether errors are ignored or assumed, and depending upon the type of error that may be generated. Upon detecting a sequence of '1000' in the TPC bit pattern meaning that the power has been decreased by 2 steps, the terminal may increase its transmit power by 2 steps, while for detection in other situations, the transmit power may be increased 3 steps because the power had been decreased by 3 steps.

If N=2, the terminal may increase its transmit power by 3 or 4 steps depending upon whether errors are ignored or assumed, and depending upon the type of error that may be generated. If four sequential '0's are detected, the transmit power may be increased 4 steps because the power had been decreased by 4 steps, and otherwise, the transmit power is increased 3 steps because the power had been decreased by 3 steps.

If N=3, the terminal may increase its transmit power by 3 or 4 steps depending upon whether errors are ignored or assumed, and depending upon the type of error that may be generated. For example, if four sequential '0's are detected, the transmit power may be increased 4 steps because the power had been decreased by 4 steps, and otherwise, the transmit power is increased 3 steps because the power had been decreased by 3 steps.

Finally, if N=4 through 30, the terminal may increase its transmit power by 3 or 4 steps depending upon whether errors are ignored or assumed, and depending upon the type of error that may be generated. Namely, if a sequence of '10000' or '00100' are detected in the TPC bit pattern, the transmit power may be increased 3 steps because the power had been decreased by 3 steps, and otherwise the transmit power may be increased 4 steps because the power had been decreased by 4 steps.

Thus, it can be understood from the above that the terminal may increase its transmit power by an appropriate amount based upon the number of power down bits detected as the indicator. Namely, the transmit power may be increased by an 'N' number of steps when an 'N' number of power down bits are detected as the indicator.

Accordingly, as shown in FIGS. 6 through 12, the terminal can detect the acquisition of uplink synchronization by various indicator detection methods according to the types of downlink TPC bit reception errors that are generated. In FIGS. 6 through 12, the bits indicated as shaded are the maximum number of bits that need to be checked for detecting the indicator, but the bits indicated within the rectangular boxes show that detection of synchronization acquisition is possible by checking only a minimum amount of data without having to consider all synchronization acquisition indicators for each type of generated error. As such, the time required for receiving a synchronization acquisition indicator is minimized, while a decrease in transmit power is prevented.

As described above, the present invention advantageously creates particular TPC patterns that can be used in the downlink TPC according to certain 'N' values, and the performance of acquiring uplink synchronization is improved by employing appropriate detection methods for the created TPC patterns.

In summary, establishing a DCH requires the UE and Node B to synchronize the physical up- and downlink channels. In one example, the downlink synchronization time lasts at least 40 ms according to current telecommunication specifications. As the UE already has received data on the S-CCPCH (Secondary Common Control Physical Channel) and thus is synchronized to the network, and the relative timing between downlink DPCH and S-CCPCH is known from L3 signaling, a first step for enhancing the DCH setup procedure is to allow the physical layer in the UE to report a CPHY-Sync-IND prior to the end of this 40 ms interval. This allows the uplink synchronization phase to start earlier. Reduction in the uplink synchronization time is also achieved when the Node B is allowed to signal to the UE when synchronization is achieved instead of using the fixed length of the power control preamble set by higher layers as discussed above. That is, one example is to initialize the UE transmit power at some suitable level and transmit power control commands depending on synchronization procedure from the Node B to the UE to ramp the UE transmit power until synchronization is achieved. Once uplink synchronization is achieved in the Node B, the UE will receive a predefined number of consecutive power down commands, indicating that uplink synchronization is achieved and ordinary power control and data transmission may begin. According to the '0101' count value of synchronization procedure, the number of the consecutive power down commands required to inform UE of uplink synchronization is shown in Table 1 (and in FIG. 5).

TABLE 1

Classification of uplink synchronization indicator set

| Patterns of '0101' count | Synchronization indicator (Not resistant to TPC error) | Synchronization indicator (Resistant to single TPC error) |
| --- | --- | --- |
| 'n=0': 111111111111111 | 0 | 000 |
| 'n=1': 011011011011011 | 00 | 00000 |
| 'n=2': 010110101101011 | 00 | 00000 |
| 'n=3': 01010110101011 | 00 | 000000 |
| ...... | 00 | 000000 |
| 'n=30' | 00 | 000000 |

Introducing the above enhancements can be done by defining "Synchronization Procedure C" in addition to procedures A and B already specified in the appropriate telecommunication standard.

Also, the present invention reduces the time in establishing a call between the terminal and base station by reducing the time in acquiring uplink synchronization in a WCDMA mobile communication system, and thus throughput losses due to delays suffered by the related art are minimized such that uplink capacity is advantageously increased.

As such, the present invention can be applied to fast DCH setup for the uplink (UL), because the switching delays between RRC states can be minimized when employing the UL synchronization acquisition indicator patterns of the present invention.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments are merely exemplary and are not to be construed as limiting the present invention. The present teachings can be readily applied to other types of methods and apparatuses. The description of the present invention is intended to be illustrative, and not to limit the scope of the claims. Many alternatives, modifications, and variations will be apparent to those skilled in the art.

What is claimed is:

1. A method of performing uplink synchronization acquisition, comprising:
    transmitting power control bits to instruct a terminal to increase its transmit power while a base station searches for uplink synchronization; and
    transmitting at least one indicator bit to indicate when uplink synchronization is acquired by the base station, the at least one indicator bit having a different number of bits being based on whether received power control bit reception errors at the terminal are considered or disregarded.

2. The method of claim 1, wherein transmitting the power control bits comprises transmitting an 'N' number of digital symbol pairs during a frame (N>0) plus a one after each $N^{th}$ digital symbol pair and at an end of each frame, each digital symbol pair including of a zero and a one, or comprises transmitting a sequence of ones if N=0.

3. The method of claim 2, wherein transmitting the at least one indicator bit transmits a single zero, if N=0 and the reception errors are disregarded.

4. The method of claim 2, wherein transmitting the at least one indicator bit transmits two sequential zeros, if $1 \leq N \leq 30$ and the reception errors are disregarded.

5. The method of claim 2, wherein transmitting the at least one indicator bit transmits three sequential zeros, if N=0 and the reception errors are considered.

6. The method of claim 2, wherein transmitting the at least one indicator bit transmits five sequential zeros, if N=1 or 2 and the reception errors are considered.

7. The method of claim 2, wherein transmitting the at least one indicator bit transmits six sequential zeros as the indicator if $3 \leq N \leq 30$ and the reception errors are considered.

8. A method of receiving an indication that a base station has acquired uplink synchronization, comprising:
    receiving instructions from the base station to increase a transmit power while the base station searches for uplink synchronization; and
    detecting at least one indicator when uplink synchronization is acquired by the base station, the at least one indicator having a different number of bits based on whether possible errors in receiving the indicator at the terminal are considered or disregarded.

9. The method of claim 8, wherein receiving the instructions comprises receiving an 'N' number of digital symbol pairs during a current frame (N>0) plus a one after each $N^{th}$ digital symbol pair and at an end of the current frame, each digital symbol pair includes a zero and a one, or comprises receiving a sequence of ones if N=0.

10. The method of claim 9, wherein detecting the at least one indicator comprises detecting a single zero, if N=0 and the reception errors are disregarded.

11. The method of claim 9, wherein the at least one indicator comprises two sequential zeros if $1 \leq N \leq 30$ and the reception errors are disregarded.

12. The method of claim 9, wherein the at least one indicator comprises at least two zeros within three sequential bits, if N=0 and the reception errors are considered.

13. The method of claim 9, wherein the at least one indicator comprises at least four zeros within five sequential bits, if N=1 or 2 and the reception errors are considered.

14. The method of claim 9, wherein the at least one indicator comprises at least five zeros within six sequential bits if $3 \leq N \leq 30$ and the reception errors are considered.

15. The method of claim 8, further comprising:
    increasing the transmit power of the terminal by an appropriate amount based on the number of power down bits detected as the indicator.

16. The method of claim 15, wherein the transmit power is increased by an 'N' number of steps when an 'N' number of power down bits are detected as the indicator.

17. A network to perform uplink synchronization acquisition, the network comprising:
    a base station to perform the steps of,
    transmitting power control bits to instruct a terminal to increase its transmit power while the base station searches for uplink synchronization; and
    transmitting at least one indicator bit to indicate when uplink synchronization is acquired by the base station, the at least one indicator bit having a different number of bits being based on whether received power control bit reception errors at the terminal are considered or disregarded.

18. The network of claim 17, wherein transmitting the power control bits comprises transmitting an 'N' number of digital symbol pairs during a frame N>0) plus a one after each $N^{th}$ digital symbol pair and at an end of each frame, each digital symbol pair including of a zero and a one, or comprises transmitting a sequence of ones if N=0.

19. The network of claim 18, wherein transmitting the at least one indicator bit transmits a single zero, if N=0 and the reception errors are disregarded.

20. The network of claim 18, wherein transmitting the at least one indicator bit transmits two sequential zeros if $1 \leq N \leq 30$ and the reception errors are disregarded.

21. The network of claim 18, wherein transmitting the at least one indicator bit transmits three sequential zeros, if N=0 and the reception errors are considered.

22. The network of claim 18, wherein transmitting the at least one indicator bit transmits five sequential zeros, if N=1 or 2 and the reception errors are considered.

23. The network of claim 18, wherein transmitting the at least one indicator bit transmits six sequential zeros as the indicator if $3 \leq N \leq 30$ and the reception errors are considered.

24. A mobile terminal to receive an indication that a base station has acquired uplink synchronization, the mobile terminal comprising:

a receiver to receive instructions from the base station to increase a transmit power while the base station searches for uplink synchronization; and a detector to detect at least one indicator when uplink synchronization is acquired by the base station, the at least one indicator having a different number of bits based on whether possible errors in receiving the indicator at the terminal are considered or disregarded.

25. The mobile terminal of claim 24, wherein receiving the instructions comprises receiving an 'N' number of digital symbol pairs during a current frame N>0) plus a one after each $N^{th}$ digital symbol pair and at an end of the current frame, each digital symbol pair includes a zero and a one, or comprises receiving a sequence of ones if N=0.

26. The mobile terminal of claim 25, wherein detecting the at least one indicator comprises detecting a single zero, if N=0 and the reception errors are disregarded.

27. The mobile terminal of claim 25, wherein the at least one indicator comprises two sequential zeros if $1 \leq N \leq 30$ and the reception errors are disregarded.

28. The mobile terminal of claim 25, wherein the at least one indicator comprises at least two zeros within three sequential bits, if N=0 and the reception errors are considered.

29. The mobile terminal of claim 25, wherein the at least one indicator comprises at least four zeros within five sequential bits, if N=1 or 2 and the reception errors are considered.

30. The mobile terminal of claim 25, wherein the at least one indicator comprises at least five zeros within six sequential bits, if $3 \leq N \leq 30$ and the reception errors are considered.

31. The mobile terminal of claim 24, further comprising: increasing the transmit power of the terminal by an appropriate amount based on the number of power down bits detected as the indicator.

32. The mobile terminal of claim 31, wherein the transmit power is increased by an 'N' number of steps when an 'N' number of power down bits are detected as the indicator.

* * * * *